United States Patent Office 2,982,201
Patented May 2, 1961

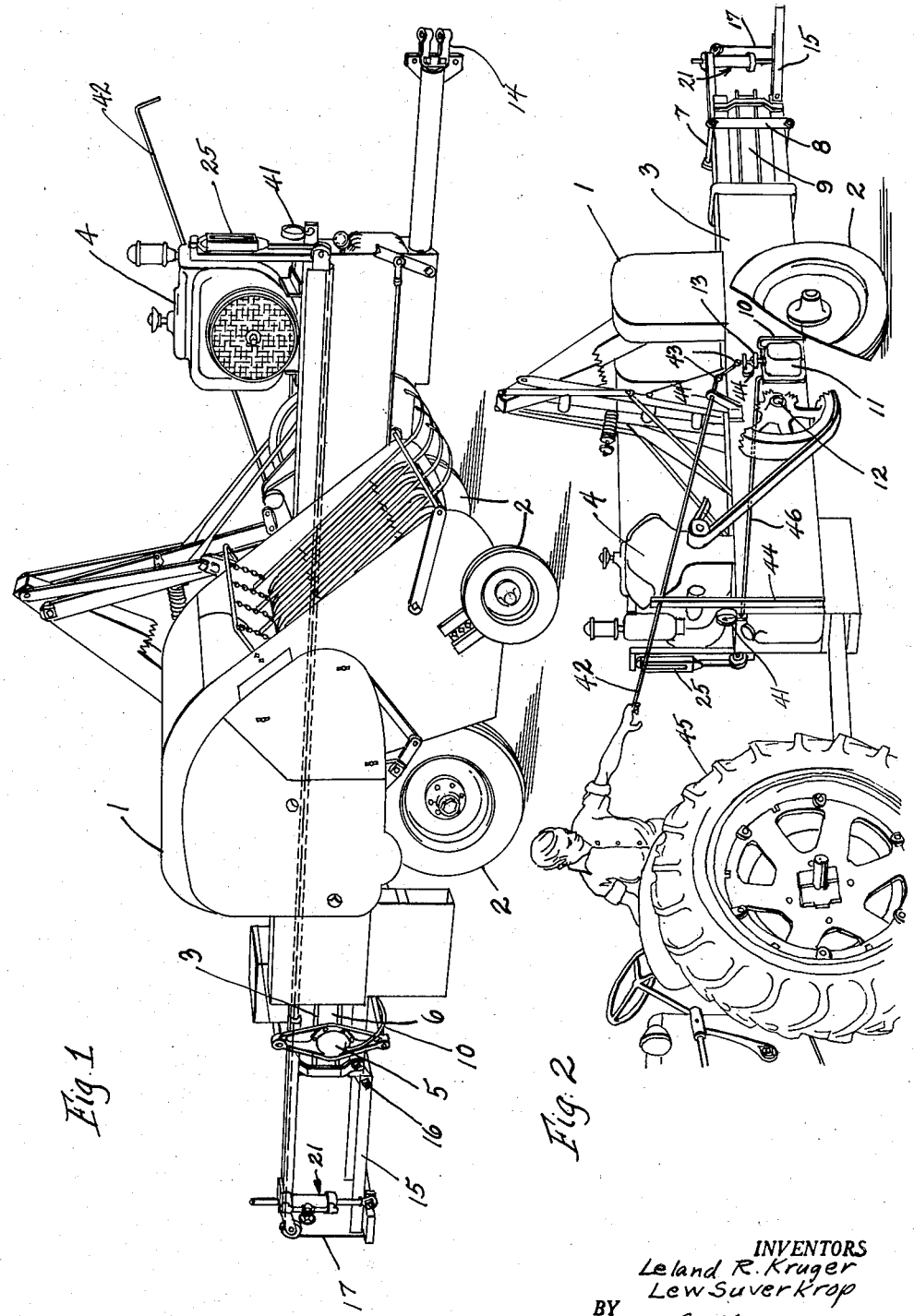

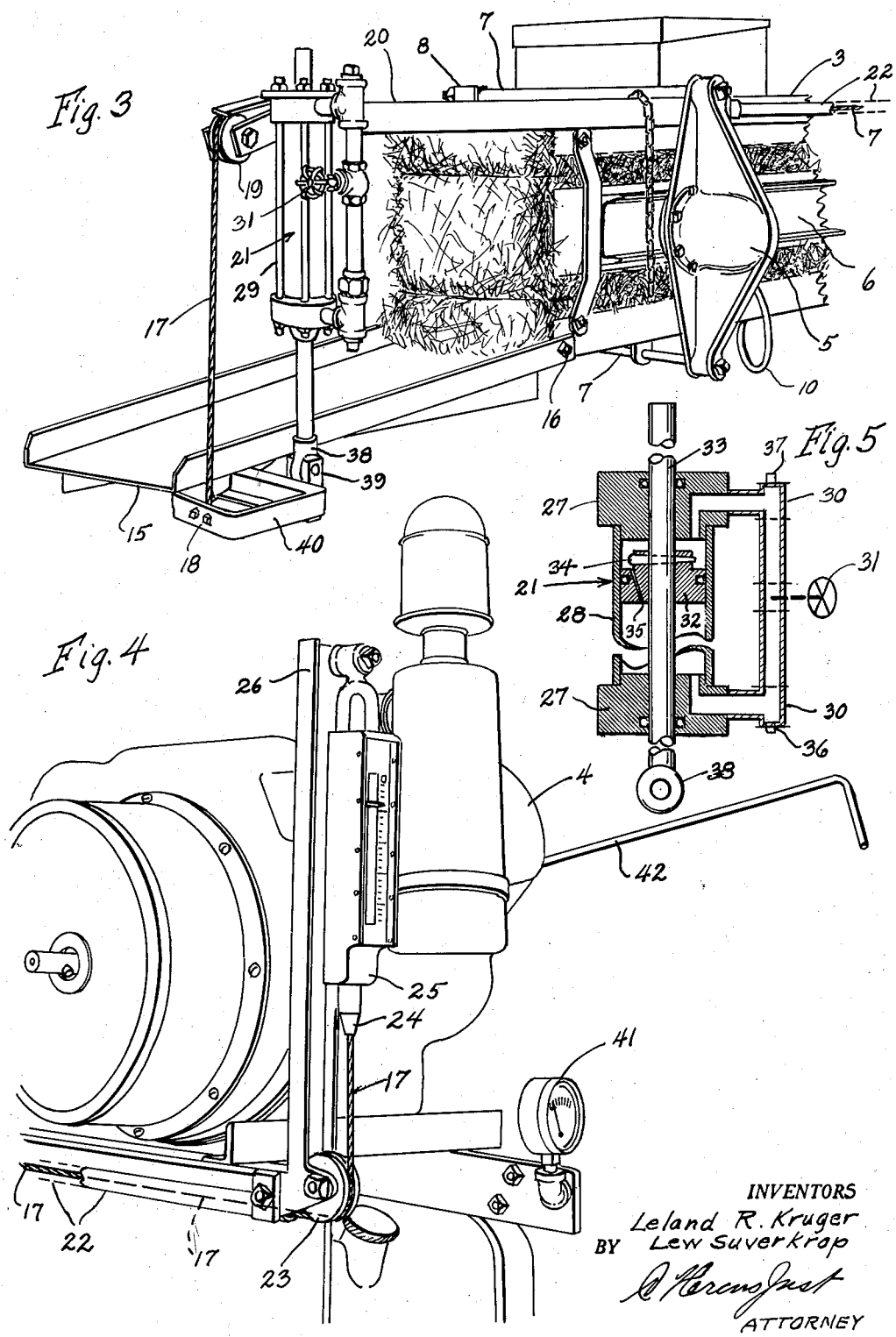

2,982,201

HAY BALERS

Leland Raymond Kruger, Rte. 1, Box 171, Buttonwillow, Kern County, Calif., and Lew Suverkrop, P.O. Box 436, Bakersfield, Calif.

Filed Dec. 29, 1954, Ser. No. 478,272

6 Claims. (Cl. 100—99)

This invention is an improvement in hay balers generally, which are machines for baling hay, straw and the like. The invention applies particularly to pickup balers. These are automatic machines which, while traveling over a hay field, rake up the cut hay from the ground, compress and tie it into bales, and then discharge the completed bales of hay.

An essential part of the pick-up baler is a chute through which the completed bale of hay, having been formed and tied, travels toward the discharge of the machine, being pushed along by the succeeding hay as it is stuffed into the chamber of the machine in the process of forming the next following bale. Means are commonly provided for varying the cross-sectional area and therefore the constriction of this chute, so as to vary the density of the hay as it is baled. Differences in the nature of the hay picked up by the baler, particularly whether the hay is relatively wet or dry, will require variation in the constriction of the chute, in order to achieve more or less uniform density in the finished bales.

Uniform bale density is important. The linear dimensions of the bales are constant. Therefore, if the hay in a given bale is insufficiently dense, it may not be held securely enough by the baling wire or twine to prevent the bale falling apart during transportation. If the hay is packed too densely into these bales of uniform dimensions, the wire or twine may break when they are handled, and the bales are likely to be of unwieldy weight. But there are added considerations of importance. Just as in transporting, stacking, and storing bales of hay they must be of uniform linear dimensions, so also it is important in reckoning any quantity of hay to have each bale closely approximate a given weight. Moreover, proper curing of hay in bales is accomplished by baling it at a suitable density.

There usually is considerable variation in the nature of the hay picked up by the baler as it travels over different parts of a hay field. At one place it may be relatively dry with a tendency to make bales loosely packed, of light density. At another place the hay may be wet, tending to result in bales of excessive density. For this reason, in the ordinary operation of a pick-up baler there is a constant and considerable problem. In a direct approach to this problem it is necessary to know the variations in the density of the bales as they are being produced, so that the constriction of chute (by whatever means employed to vary it) may be adjusted as required to achieve uniform bale density, whatever the varying condition of the hay as picked up in different parts of the hay field.

Thus the primary object of the present invention is to provide simple means whereby the operator of the baler, without additional help and while continuing operation of the baler may accurately and readily measure and observe the actual weight of each bale being produced. Since the bale volume is constant, this gives a direct and accurate measure of the density of the baled hay. This pertinent information is wanted for the particular reason so that the density controlling mechanism, i.e., the chute constriction, may be promptly regulated so as to achieve and maintain precisely uniform weight in the bales of hay.

These factors direct themselves toward the objective to assure production of bales of nearly uniform weight such as will be not so loose as to fall part during transportation; not so dense as to risk breakage of baling wire or twine; nor so heavy as to be unwieldy; but of an expected, nearly common and reliably reckonable actual hay content; and of density always suitable to proper curing of the contained hay.

Still another object of this invention is determining the total, aggregate weight of hay baled from a given field or during a certain period of time. This is of especial value when hay is baled for a hay farmer by a baler owner on a contract basis at so much per ton. Many hay balers are equipped with digital counters which record the number of bales produced. By making it possible to produce bales of nearly uniform weight, a reliable average bale-weight is readily obtained by actually weighing only a few bales in selected parts of the field. Multiplying this average bale-weight by the total number of bales produced quickly gives the total actual weight of hay baled for which the farmer is to pay the baling contractor. Thus, not only is the farmer assured of bales each of optimum suitable weight, but there is avoided the controversial situation which may obtain where a contract is based simply on the number of bales. In such case, naturally it is to the baling contractor's advantage to bale as many bales as possible. Obviously, this may occasionally lead to bales unsuitably light and loose, as well as to an excessive cost when referred to the actual weight of hay baled.

Details of these and other incidental objects and of the preferred embodiments of the invention will be apparent in the following specification and claims, and in the accompanying drawings, in which Fig. 1 is a perspective view given in sufficient detail to be recognized by one skilled in the art as one form of baler to which the improvement comprising the present invention may be applied, and showing in rather greater detail parts comprising the invention.

Fig. 2 is a perspective view of the other side of such baler, together with details of the invention. This view also indicates the manner in which such baler may be hitched to a tractor, part of which is shown fragmentarily, and the relative position of a tractor operator to the baler.

Fig. 3 is a fragmentary perspective view of the baler illustrating the hinged platform where the mass of each bale applies itself to actuate the weighing mechanism, and associated details required in a practical application of the invention.

Fig. 4 is a fragmentary perspective view of certain details of the invention including a scale which indicates the weight of each bale before its final discharge from the baler, and associated details of the invention.

Fig. 5 is a vertical section view, partly diagrammatic, of details of a hydraulic damping cylinder.

Referring more particularly to the drawings:

In Figs. 1 and 2, details which are not particularly pertinent to the operation of this invention are generally omitted from the drawings, except as deemed necessary to insure that the drawing will be recognized by those skilled in the art as representative of a baler of the kind to which this invention may be applied. For similar reasons, the text of this specification omits consideration of details of such balers. For further details of such balers, apart from the present invention, reference may be made to a number of patents covering different hay balers such as, for example, Patent No. 2,236,628 to Nolt, which gives details of one such baler commonly known as the New Holland.

Figs. 1 and 2 comprises a general representation of a baler 1 mounted on wheels 2 with the bale chute 3 extending rearwardly. The raking or pick-up mechanism, the plunger, etc., driven by the engine 4, and other parts of the baler such as the compression chamber, the tying mechanism, etc., are not presented in any detail where they are not particularly pertinent to this invention. Fig. 2 indicates the manner in which the baler 1 may be drawn by a tractor 45, making use of the hitch 14 shown in Fig. 1.

In the baler 1 as indicated in Figs. 1 and 2, control of the constriction of the chute 3 is accomplished by varying the width between two opposite sides of the chute 3 by hydraulic means. The hydraulic cylinder 5 has a plunger which acts directly against the pressure plate 6 which, in turn, bears directly against the baled hay in the chute 3. This is shown in more detail in Fig. 3. The reaction from the plunger in the cylinder 5 is transmitted to the other side of the chute 3 by means of the tie rods 7, above and below the chute 3. These tie rods 7, as indicated in Figs. 2 and 3, are secured to a member in the form of a beam 8 which bears directly against a second pressure plate 9. Like pressure plate 6, this pressure plate 9 also bears directly against the baled hay in chute 3. Thus the action and reaction due to hydraulic pressure in cylinder 5 results in pressure bearing directly on the baled hay in chute 3, through the two plates 6 and 9. Obviously, this pressure on the hay results in proportional constriction of the chute 3, and these may be quickly and conveniently changed simply by changing the hydraulic fluid pressure in cylinder 5.

Hydraulic fluid enters the cylinder 5 from the pipe 10 which conducts it from the hydraulic "power-pack" unit 11. Of a construction well known to those familiar with the art, this unit consists essentially of the following: (1) A self-contained sump with a supply of hydraulic fluid, usually oil. (2) A small high-pressure pump which is chain-driven from the main shaft 12 of the baler 1. This pump draws fluid from the sump and forces it into the pipe 10. (3) A variable relief valve connected to the pipe 10 which controls the pressure in the pipe 10. This relief valve, acting like an easily adjusted safety valve, is regulated by turning a small hand wheel 13 on the outside of the unit 11, and discharges into the sump any excess fluid from the pump beyond that necessary to maintain the hydraulic pressure determined by the position of the hand wheel 13. (4) A connection to the pipe 10 for a pressure gage to indicate the hydraulic pressure within the pipe 10.

The usual practice is to mount this pressure gage directly on the outside of the unit 11, close to the hand wheel 13; and the position of unit 11 is usually about as indicated in Fig. 2, on one side of the baler 1, near the middle thereof, in back of one of the wheels 2 and the drive pulley on the main shaft 12. Thus, with the usual construction, it is necessary for one to go directly to the unit 11 in order either to regulate or to observe the hydraulic pressure, usually requiring a stoppage in the baling operations.

From this it will be clear that in the operation of such a baler, as presently furnished without the improvement comprising the present invention, the relative density of bales being produced must be guessed at or estimated from their appearance. This is far from reliable because a considerable change in density usually occurs before there is any noticeable change in appearance. Then, if the density is considered to be different from that desired, the pressure control wheel 13 on unit 11 is turned to increase or decrease the hydraulic fluid pressure in the pipe 10, in which operation the pressure gage usually also on the unit 11 serves as a guide. If the operator is not to leave his usual operating position in order to observe the density of the bales and to make the desired adjustment in chute constriction, an additional operator is required.

The present invention includes a bale receiving member comprising preferably a platform member 15 hingedly connected by bolts 16 to the discharge end of the chute 3. This hinged platform 15 is provided with flanges at the sides so as to strengthen the platform and also to provide means to guide the bales of hay along its surface, along which each bale is pushed by the next succeeding bale of hay. The surface of the platform 15 is located slightly lower than the bottom surface of chute 3 so that the succeeding bale of hay will not act upon the platform 15 until it has issued entirely from chute 3 and dropped onto the surface of platform 15. Moreover, the length of platform 15 is made such that when the center of gravity of the bale of hay resting on platform 15 is approximately aligned with the rearward end of platform 15, the succeeding bale of hay will not yet have dropped out of chute 3 onto platform 15. By this choice of position and dimensions of platform 15, its action is practically separated from any significant influence of friction between the bale on platform 15 and the succeeding bale issuing from chute 3. Thus, for all practical purposes, the angular position of the platform 15 will be determined solely by the effective tare weight of platform 15 including its attached parts, plus the net weight of the bale upon it, and a spring force acting on platform 15 in a direction against that of these weights.

As indicated in Figs. 1 and 3, a flexible cable 17 is attached by suitable means to the platform 15 at a point aligned with the outboard end thereof. This cable 17 runs vertically upward to pulley 19 which directs it horizontally forward into the channel 20. This channel 20 is of hollow square cross-section and is stoutly attached to a member of the chute 3 from which, in cantilever form, it extends rearwardly from the baler. Channel 20 not only serves to protect cable 17 but also serves to support the bracket for pulley 19 and a damping device, hydraulic cylinder 21.

At its forward end on the baler 1, the channel 20 joins a tubular member 22 which extends on forward along the side of baler 1, carrying cable 17 to a second pulley 23, shown in Fig. 4, at the front end of baler 1. Pulley 23 redirects the cable upward to the operating connection 24 of weighing means such as the scale or spring balance 25, of common construction, whereby cable 17 interconnects bale receiving member 15 and weighing means 25. Scale 25 is fixed by conventional means to the member 26 which is securely attached to the framework of the baler 1 preferably in such a position that the scale 25 may be readily observed visibly by the operator from his usual position when operating the baler, as when seated upon the tractor 45 as indicated in Fig. 2.

With this construction the scale 25 will normally indicate the gross weight of a bale of hay on platform 15 at the instant when that bale is balanced with its center of gravity aligned with the rearward end of platform 15, just before it tumbles onto the ground. This gross weight, of course, includes the effective tare weight of the platform 15. But the usual form of scale 25 includes common calibrating means so that it may be adjusted to cancel out the tare and thus directly indicate the actual net weight of the bale of hay alone.

In order to improve the accuracy of readings of weight in an equipment which is moving over more or less rough ground, damping means may be provided such as the hydraulic damping cylinder assembly 21. This is secured to the channel 20, and has its piston rod 33 with eye 38 pivoted at 39 to the bracket 40 which is secured to the platform 15. When properly adjusted, damping cylinder 21 does not sensibly reduce the accuracy of readings given by scale 25. On the contrary, adjusted so as to dampen only the larger fluctuations caused by the bouncing movement of the baler 1 over rough ground, damping cylinder 21 causes no appreciable lag in downward movement of platform 15 effected by the rearward movement of a bale of hay upon it. Thus the readings of the scale 25 are hastened and made more accurate than is the case without damping means. In the case of hydraulic damping this is accomplished by providing a suitable regulation of the fluid which tends to surge from one end to the other of the cylinder as a result of the movement of the piston.

Details of a damping cylinder assembly 21 shown in Fig. 5 include cylinder heads 27 at the ends of the cylinder proper 28, held in place by tie rods 29 shown in Fig. 3. Cylinder heads 27 are ported and connected through the T's 30 to the adjusting valve 31. Piston 32 may be joined to the piston rod 33 by common means such as the taper pin 34. The piston 32 is provided with a small diameter vent hole 35 for the purpose of draining the system of air that otherwise might become entrapped below piston 32 and interfere with effective hydraulic damping. A plug 36 in the lower T 30 may be withdrawn for draining the system of liquid. The upper T 30 is provided for filling the system with liquid, after which it is closed with plug 37.

When filling the cylinder assembly 21 with liquid, the liquid will first enter the lower cylinder head 27 and force air ahead of it to the piston 32 where it will escape through the small vent 35 in the piston and eventually out through the upper T 30. After the system has been entirely filled with hydraulic fluid, closing upper T 30 by plug 37 makes cylinder 21 ready for damping with effect depending on the opening of throttle valve 31. Piston rod 33 extends through both cylinder heads 27 so that the effective area of piston 32 is the same in both ends of the cylinder 28. Consequently, damping action is the same for both upward and downward motion. Suitable packing means, such as O rings, are provided for piston 32 and piston rod 33.

So that the operator, without moving from his operating position, may adjust the hydraulic pressure in the power pack unit 11, a manually operable handle extension 42 is provided which includes common universal joints 43 and supports 44 and is connected to the hand wheel 13 of the hydraulic control valve of unit 11. Similarly, the pressure gage 41 is removed from its usual position on the unit 11 and is connected to suitable pipe 46 so as to relocate it in a place where the operator, in his normal working position, may readily observe it, as indicated in Figs. 1, 2, and 4.

Thus, as shown in Fig. 2, the operator in his normal position can readily observe the density of the bales being then produced as indicated by scale 25. He can alter the hydraulic pressure in cylinder 5 as he desires; and he can check his pressure adjustments by means of gage 41.

In summary, the operation of a baler, particularly as it may be equipped with the improvement described in this specification, is as follows: During his normal operation of the baler the operator determines the density of the bales being produced by occasional observation of scale 25. When the reading indicates deviation from desired density, handle 42 is turned to alter the constriction of chute 3 as required to re-establish the desired density. Where hydraulic means are used for varying chute restriction, readings on gage 41 guide the operator when taken with those on scale 25 as to the exact amount to turn handle 42.

In respect of the operation of a baler equipped with this improvement, the following will be noted: (a) The operator's management of the baler is not interrupted as would be the case were he required to leave his usual operating position as, for example, to examine bales from the machine lying on the ground or to adjust the chute constriction by turning valve 13. (b) The prompt and required density adjustment is accomplished without services of an additional operator or assistant. (c) An accurate and direct determination of density by actual physical measurement is readily and continuously available during normal operation of the baler, rather than uncertain guessing or an occasional, relatively unreliable "estimate" merely based on the appearance of the bales. For these reasons this improvement achieves its objectives outlined above with simplicity and conveinence, and with a saving in labor.

While the invention has been shown and illustrated in its preferred embodiment, and has included certain details, it should be understood that the invention is not to be limited to the precise details herein illustrated and described since the same may be carried out in other ways falling within the scope of the invention as claimed. In particular, the improvement comprised within this invention may be a part of a baler whether of the pick-up or any other type, and if mobile, while illustrated as drawn by a tractor, may be drawn by any other means. Moreover, while illustrated are chute constriction and control means of the hydraulic type, the invention is applicable where any other chute constriction and control means are used such as the purely mechanical (for example, by simple threaded rods and nuts). Further, it is applicable regardless of means (corresponding to gage 41) used for indicating the degree of constriction of the chute, and in the absence of any such means. Similarly, while a hydraulic damping cylinder is illustrated in this specification, it is to be understood that any other damping device such as an automotive shock absorber might be used, and other damping means might be employed as by friction, by Foucault Currents, etc.

We claim:

1. A mobile hay baler having a discharge chute at the rear end thereof within which bales are formed successively and discharged therefrom rearwardly, in combination with a platform member positioned in longitudinal alignment with said rear end of said chute and pivotally connected at one end to the rear end of said chute to slidably receive bales individually as discharged from said chute, weight indicating means comprising a graduated scale and movable pointer connected to and positioned upon said baler so as to be viewable by an operator in his normal operating position relative to said baler while moving along a field, means connected at one end to said platform member so as to be movable thereby in response to movement of said member when a bale is received thereon and also extending to and being interconnected to the movable pointer of said weight indicating means to cause the weight of a bale upon said platform member to be indicated by said pointer relative to said scale prior to said bale being discharged therefrom by the next succeeding bale as discharged from said chute onto said member, and movement damping means supported by said baler adjacent said platform member and having a movable member connected to said platform member intermediately of the ends thereof and operable to damp the movements of said platform member in opposite directions as said baler moves along a field, thereby steadying said platform member to facilitate the rapid indication of the weights of said bales for observance by the operator of the baler.

2. The mobile hay baler set forth in claim 1 further including a supporting arm connected to said baler and extending rearwardly from said chute and supporting said damping means at the outer end thereof in a position intermediately of the ends of said platform member.

3. The mobile hay baler set forth in claim 1 further characterized by said movement damping means having a movable member comprising a hydraulic cylinder supported by said baler, a piston movable therein and having a piston rod connected at one end to said platform member, and a closed hydraulic system connected to said cylinder and operable to retard the reciprocation of said piston and weighing member in opposite directions.

4. A mobile hay baler having a chute within which bales are formed successively and discharged from one end thereof adjacent the rear end of said baler, an elongated member movably positioned adjacent the rear end of said chute and in longitudinal alignment therewith to slidably receive bales as discharged successively from said chute incident to being weighed; a closed system hydraulically operated movement damping means supported by said baler adjacent the rear end of said chute and including a piston movable in a cylinder, means interconnecting said piston to said movable elongated bale receiving member, by-pass conduit means extending between opposite ends of said cylinder and operable to bypass fluid from one end of the cylinder to the other to damp the movements of said bale receiving member in opposite directions upon the same receiving a bale, and an adjustable control valve connected in said by-pass conduit means and operable to control the force exerted by said damping means upon said receiving member.

5. A mobile hay baler having a chute adjacent the rear end thereof within which bales are formed successively and discharged from the rearward end thereof, in combination with platform means positioned rearward of said chute and in longitudinal alignment therewith to receive bales slidably and individually as discharged therefrom and weigh the same, weight indicating means connected to and actuated by said platform means and positioned upon said baler adjacent the forward end thereof so as to be viewable by an operator in his normal operating position forwardly of said baler while moving along a field, means comprising a hydraulic cylinder and piston unit connected to said chute and operable to vary the position of one wall of said chute to increase or decrease the size of the bale as required to produce successive bales of substantially uniform weight, a hydraulic system including means to supply hydraulic fluid under pressure connected to said unit, control means comprising a relief valve connected into said hydraulic system to regulate the pressure exerted by said hydraulic unit, an elongated operating member connected to said relief valve and extending forwardly to a handle positioned conveniently to be engageable by said operator from his said normal operating position forwardly of said baler to effect adjustment of said chute according to the weight indicated by said indicating means, and movement damping means supported by said baler adjacent said platform means and having a movable member connected to said platform means intermediately of the ends thereof and operable to damp the movements of said platform means in opposite directions as said baler moves along a field, thereby steadying said platform member to facilitate the rapid indication of the weights of said bales for observance by the operator of the baler.

6. A mobile hay baler having a chute adacent the rear end theerof within which bales are formed successively and discharged from the rearward end thereof, in combination with a weighing platform pivotally connected at one end to and extending rearwardly from said chute to receive bales slidably from said chute as discharged therefrom, weight indicating scale means carried by said baler forwardly thereof and readily viewable by an operator in his normal operating position forwardly of said baler while moving along a field, flexible means connected at one end to said pivoted platform and extending forwardly therefrom to said scale means and connected thereto to actuate the same and indicate the weight of a bale upon said platform, guide means supporting said flexible means, means connected to said chute and operable to vary the cross-sectional area of same to increase or decrease the size of the bale as required to produce successive bales of substantially uniform weight, control means connected to said chute varying means and including an actuating member extending forwardly of said baler and having a handle positioned conveniently to be engageable by said operator from his said normal operating position forwardly of said baler to effect adjustment of said chute according to the weight indicated by said indicating means, and movement damping means supported by said baler adjacent said platform and having a movable member connected to said platform intermediately of the ends thereof and operable to damp the movements of said platform in opposite directions as said baler moves along a field, thereby steadying said platform to facilitate the rapid indication of the weights of said bales for observance by the operator of the baler.

References Cited in the file of this patent

UNITED STATES PATENTS

| | | |
|---|---|---|
| 370,171 | Wickey | Sept. 20, 1887 |
| 406,455 | Maurer | July 9, 1889 |
| 659,292 | Culmer | Oct. 9, 1900 |
| 2,135,379 | Ambers | Nov. 1, 1938 |
| 2,576,784 | Dodds et al. | Nov. 27, 1951 |
| 2,596,872 | Skromme | May 13, 1952 |
| 2,628,554 | Phillips | Feb. 17, 1953 |
| 2,643,781 | Wise | June 30, 1953 |
| 2,676,532 | Hill | Apr. 27, 1954 |
| 2,724,324 | Clarke | Nov. 22, 1955 |
| 2,796,825 | Kriegbaum et al. | June 25, 1957 |

FOREIGN PATENTS

| | | |
|---|---|---|
| 80,314 | Austria | Mar. 26, 1920 |